United States Patent [19]

Mitariten

[11] Patent Number: 5,053,058
[45] Date of Patent: Oct. 1, 1991

[54] CONTROL PROCESS AND APPARATUS FOR MEMBRANE SEPARATION SYSTEMS

[75] Inventor: Michael J. Mitariten, Peekskill, N.Y.

[73] Assignee: UOP, Des Plaines, Ill.

[21] Appl. No.: 459,157

[22] Filed: Dec. 29, 1989

[51] Int. Cl.$^5$ .................................................. B01D 53/22
[52] U.S. Cl. .......................................... 55/16; 55/18; 55/20; 55/158; 55/218
[58] Field of Search ..................... 55/16, 18, 20, 158, 55/218, 68

[56] References Cited

U.S. PATENT DOCUMENTS

| | | | |
|---|---|---|---|
| 3,975,170 | 8/1976 | Keating, Jr. | 55/18 X |
| 4,172,885 | 10/1979 | Perry | 55/16 X |
| 4,397,661 | 8/1983 | King et al. | 55/158 |
| 4,421,529 | 12/1983 | Revak et al. | 55/21 X |
| 4,497,640 | 2/1985 | Fournié et al. | 55/21 X |
| 4,765,804 | 8/1988 | Lloyd-Williams et al. | 55/18 X |
| 4,806,132 | 2/1989 | Campbell | 55/16 |
| 4,863,492 | 9/1989 | Doshi et al. | 55/16 |

FOREIGN PATENT DOCUMENTS

| | | | |
|---|---|---|---|
| 771472 | 11/1967 | Canada | 55/16 |
| 1062176 | 9/1979 | Canada | 55/16 |
| 1186245 | 4/1985 | Canada | 55/16 |
| 0017463 | 10/1980 | European Pat. Off. | 55/16 |
| 0051469 | 5/1982 | European Pat. Off. | 55/16 |
| 0060693 | 9/1982 | European Pat. Off. | 55/16 |
| 0329962 | 8/1989 | European Pat. Off. | 55/16 |
| 57-013329 | 3/1982 | Japan | 55/21 |
| 63-137729 | 6/1988 | Japan | 55/16 |
| 63-236517 | 10/1988 | Japan | 55/16 |
| 0652125 | 3/1979 | U.S.S.R. | 55/16 |
| 1119718 | 10/1984 | U.S.S.R. | 55/16 |

Primary Examiner—Robert Spitzer
Attorney, Agent, or Firm—Thomas K. McBride; John G. Tolomei; Warren K. Volles

[57] ABSTRACT

A process and an apparatus are disclosed for controlling the concentration of a component in an effluent stream from a permeable membrane gas separation system. A gaseous feed stream is passed to the membrane system at a substantially constant flow and elevated pressure. Control is achieved by sensing a characteristic of an effluent stream that is indicative of the concentration of the component, i.e., permeate or non-permeate stream, and performing a pressure adjustment on the permeate stream or non-permeate stream, to vary the concentration of the component in the effluent stream as necessary to obtain a predetermined concentration of the component in the effluent stream. A product stream having a relatively constant pressure and purity can be obtained by sensing a characteristic of a desired effluent stream, e.g., permeate, and performing a pressure adjustment on the other effluent stream, e.g., non-permeate.

16 Claims, 1 Drawing Sheet

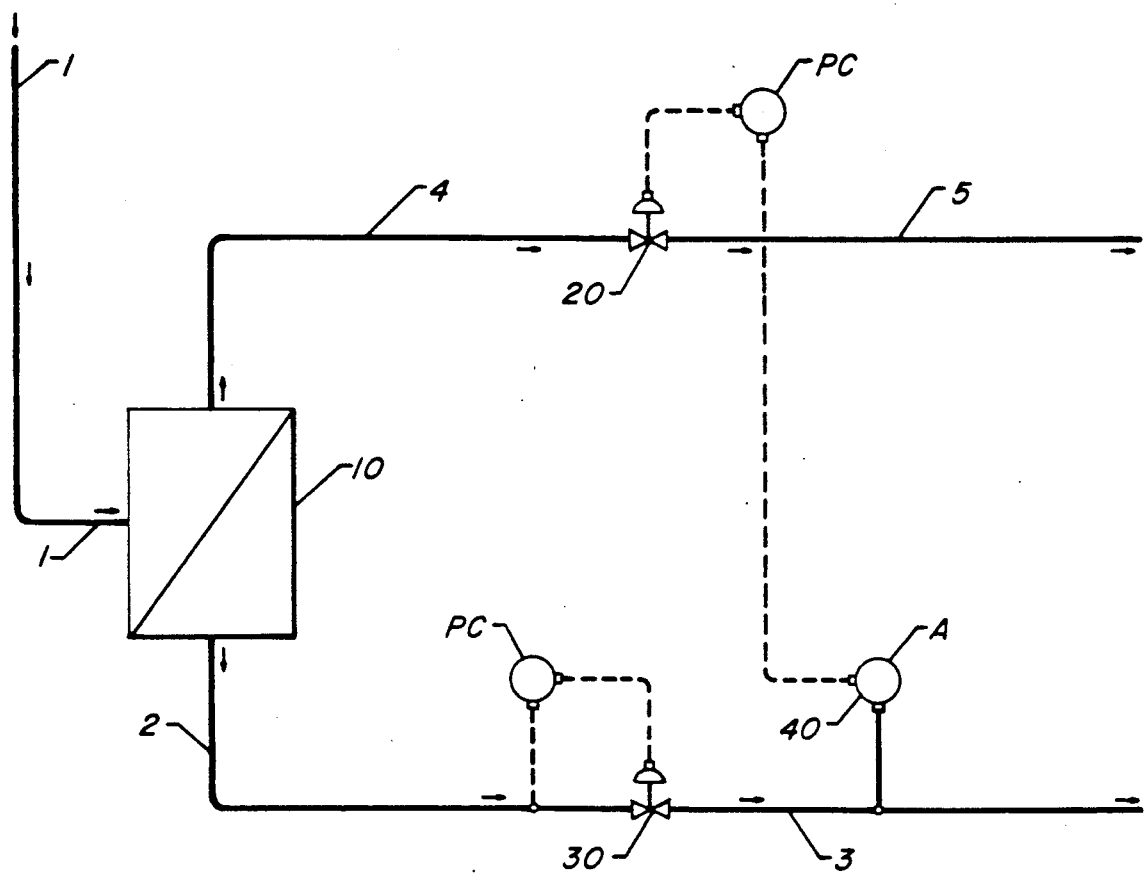

CONTROL PROCESS AND APPARATUS FOR MEMBRANE SEPARATION SYSTEMS

FIELD OF THE INVENTION

The present invention generally relates to permeable membrane systems and more particularly to a process and an apparatus for controlling the concentration of components in the effluent streams from the membrane systems.

BACKGROUND OF THE INVENTION

Permeable membrane systems are known in the art and have been proposed for a variety of gas and liquid separations. In a typical membrane system, a feed stream is contacted with the surface of the membrane, and the more readily permeable component of the feed stream is recovered as a permeate stream and the less readily permeable component is recovered as a non-permeate, or retentate, stream.

Gas separations utilizing membranes are effected by contacting the feed stream with the surface of the membrane at an elevated pressure and withdrawing the permeate stream at a reduced pressure, relative to the elevated feed pressure. Significant factors in the design and overall efficiency of membrane systems are the total membrane surface area required for a given separation and the partial pressure difference across the membrane that is required to obtain a desired product quanity and quality. The design of membrane systems requires a balancing of these factors. That is, the greater the partial pressure difference, or driving force, across the membrane, the less is the membrane surface area required for a given separation. High pressure difference, low area operation necessitates the use of more expensive pumping equipment and higher pump operating costs, but enables membrane equipment costs to be kept relatively low. If, on the other hand, a lower driving force is employed, more membrane surface area is required, and the relative costs of the various aspects of the overall system and operation would change accordingly.

Membrane systems are often designed and optimized for full capacity, steady flow and composition conditions that are not always encountered in practice. When conditions exist that are different than the design conditions, the products recovered from the membrane system may contain undesirable concentrations of certain components. Under such conditions, different requirements exist with respect to partial pressure differences and membrane area in order to maintain a given product purity.

The problem of membrane control in turndown situations has been addressed in U.S. Pat. No. 4,806,132, issued to Campbell, which discloses a process for controlling permeable membrane separation systems when there are reduced product demand, or lower product purity requirements. The process of the above-identified patent operates by reducing the feed flow and the partial pressure driving force across the membrane. As a result, the product purity or flow is reduced. The patent further discloses that the driving force is reduced by reducing feed pressure or increasing permeate side pressure. The above-identified patent also discloses other known techniques for controlling product quality in turndown conditions including reducing the surface area of the membrane, i.e., by shutting down one or more membrane sections, or by employing a surge tank to handle variable demand requirements.

U.S. Pat. No. 4,397,661, issued to King, et al., discloses a process for the separation of fluids using at least two membrane permeator stages which can provide high turndown rates of permeate while maintaining substantially constant concentrations of at least one moiety in the permeate. In the process disclosed in the above-identified patent, a feedstream containing a permeating moiety and a slower permeating moiety is provided to each of a plurality of permeator stages containing selectively permeable membranes. Permeate from at least one of the stages is allowed to pass only when the combined permeate flow surpasses a predetermined rate, and such passage is terminated only when the combined flow drops below a predetermined rate.

U.S. Pat. No. 4,863,492, issued to Doshi, et al., discloses a gas permeation process and system for integrating a gas permeable membrane system with a multiple bed pressure swing adsorption system to produce a mixed gas product having a preset adjustably controlled gas ratio and a high purity second gas component. The patent discloses the use of a control valve on the permeate stream that can respond to changes in feed flowrate or composition in order to provide a constant throughput for the blended product. The feedstream is analyzed for flowrate and/or composition and the control valve is adjusted in response thereto.

In many instances, however, when the feedstream is subject to changes in feed composition, it is desirable to maintain the product purity of one of the effluent streams, i.e., permeate or non-permeate, since the product from the permeate membrane separation system may be used for further downstream processing. Moreover, it is often further desirable to maintain a relatively constant pressure as well as purity of the product stream despite fluctuations in feed composition. Feedstream compositional changes are also often accompanied by minor variations in feedstream flowrate, i.e., less than about ±20% of the design flow. In such cases, turndown in product flow is undesired. Accordingly, processes are sought for controlling the concentration of a component in an effluent stream from a permeate membrane gas separation system when the feed stream is subject to fluctuations in feed composition. Furthermore, processes are sought which can provide a product stream having relatively constant purity and pressure.

SUMMARY OF THE INVENTION

A process and an apparatus are provided for controlling the concentration of a component in an effluent stream from a permeable membrane gas separation system wherein the feed to the system is available at a substantially constant flow rate and elevated feed pressure and is subject to fluctuations in feed composition. The process and apparatus of the present invention can provide a product stream, i.e., permeate or non-permeate, having a relatively constant purity that is suitable for further downstream processing.

In a broad aspect of the invention, the process includes the steps of (a) passing a gaseous feed stream comprising a component, the concentration of which is to be controlled, to a permeable membrane gas separation system at a substantially constant flow rate and elevated feed pressure, where the feed pressure is equal to or higher than the pressure required to operate the permeable membrane gas separation system and the feed stream is subject to fluctuations in composition; (b) recovering a permeate stream and a non-permeate stream from the permeable membrane gas separation system; (c) sensing a characteristic of one of the permeate stream or non-permeate stream that is indicative of the concentration of the component; and (d) performing a pressure adjustment on the permeate stream or non-permeate stream in response to the sensed characteristic to alter the concentration of said component in said effluent stream, where the pressure adjustment is effective to vary the concentration of the component in the permeate or non-permeate stream as necessary to obtain a predetermined concentration of the component.

Preferably, a characteristic of a desired product stream, e.g., permeate, that is indicative of the concentration if the component is sensed. When it is desired that the product stream have a relatively constant pressure, the pressure adjustment is preferably performed on the other product stream, e.g., non-permeate, in response to the sensed characteristic. Thus, the desired product stream can have both a relatively constant pressure and purity.

In another aspect of the present invention, an apparatus is provided for controlling the concentration of a component in an effluent stream from a permeable membrane gas separation system. The apparatus includes, (a) a membrane separation system containing at least one gas permeable membrane; (b) means for passing a gaseous feed stream comprising the component to the membrane separation system at a substantially constant flow rate and elevated feed pressure; (c) means for recovering a permeate stream and a non-permeate stream from the membrane separation system; (d) means for sensing a characteristic of one of the permeate stream or the non-permeate stream that is indicative of the concentration of said component; and (e) means for performing a pressure adjustment on the permeate stream or the non-permeate stream in response to the sensed characteristic.

BRIEF DESCRIPTION OF THE DRAWING

The drawing is a schematic representation of an apparatus for sensing the permeate stream and adjusting the non-permeate stream in accordance with a preferred aspect of the present invention.

DETAILED DESCRIPTION OF THE INVENTION

The processes and apparatus of the present invention relate to controlling the concentration of a component in an effluent stream from a permeable membrane gas separation system and accordingly, can be applied to virtually any gas phase membrane separation. Typical types of separation processes to which the present invention can be applied include, but are not limited to, those wherein a membrane unit is used alone, in series with other membrane units, and integrated systems with other unit operations such as adsorption units. Representative of a membrane separation process that can be utilized without other operations is that disclosed in U.S. Pat. No. 4,608,060 wherein polar gases such as hydrogen sulfide, sulfur dioxide, and ammonia may be separated from non-polar gases such as methane, nitrogen, hydrogen or carbon dioxide using a multicomponent, i.e., two or more component, membrane. U.S. Pat. No. 4,180,388 discloses processes for separating gases using at least two permeator stages in series wherein the permeate from a first stage is withdrawn at pressure that is intermediate between the first stage feed pressure and the final stage permeate pressure, thereby diminishing, if not eliminating, the need for recompression prior to use in subsequent downstream chemical processing. Representative of integrated processes are processes such as disclosed in U.S. Pat. No. 4,172,885 wherein chilling and scrubbing steps are utilized to remove ammonia from an ammonia synthesis gas purge loop prior to the membrane separation of hydrogen and nitrogen from other remaining gases. Similarily, U.S. Pat. No. 4,645,516 discloses an integrated adsorption-membrane system to perform the above-described ammonia synthesis gas separation as well as other separations such as the recovery of hydrogen and carbon dioxide from methanol and other gases contained in a methanol synthesis purge gas loop.

It is often desirable in permeable membrane gas separation processes to recover one product, i.e., permeate or non-permeate, at a relatively constant purity and pressure level due to downstream processing requirements. By the present invention, a process and an apparatus are provided for controlling the concentration of a component in an effluent stream from a permeable membrane gas separation system wherein the feed stream is subject to fluctuations in feed composition. The feed stream suitable for processing in accordance with the present invention is one that is available at a substantially constant flow and an elevated pressure. The term "substantially constant flow" is intended to include minor variations from the design flow. Typical flow variations are within ±20 percent and preferably within 10 percent of the design flow. Similarly, the term relatively constant pressure level is intended to include pressure variations within 20 percent of the design product pressure and preferably within ±10 percent. The term "elevated pressure" is denoted to mean a pressure that is equal to or higher than the pressure required to operate the membrane. Accordingly, the present invention does not require the adjustment of feed flow rate or pressure, i.e., use of feed compressor, in order to control the concentration of a component in one of the effluent streams. It is within the scope of the present invention, however, to utilize a main feed compressor, or recycle gas compressor when recycle streams are utilized, to provide a feed stream pressure necessary to perform the desired separation. The degree of fluctuation in the feed composition will be dependent on the feed source. For example, there may be relatively little variation in a feed stream from an ammonia synthesis purge gas loop operating at steady state. On the other hand, during dynamic operation, e.g., start-up, the fluctuations may be substantial. When processing pipeline gas or catalytic reformer off-gas, for example, the feed stream may also vary substantially. Those skilled in the art can determine the anticipated range of fluctuations in feed composition for a particular application. Preferably, however, the fluctuations in the concentration of the controlled component composition will not be more than about 30 percent of the design composition level. For example, if the design feedstream contains 70 mol % hydrogen, the hydrogen content will preferably not vary more than about from 49 to 91 mole %.

In the operation of the membrane system, the feed gas is contacted with an upstream surface of the membrane at an elevated pressure and a permeate stream is withdrawn from a downstream surface of the membrane at a reduced pressure relative to the feed pressure. A nonpermeate, or retentate stream is withdrawn from the upstream surface of the membrane, typically at a pressure close to the feed pressure and intermediate between the feed pressure and the permeate stream pressure. It is generally believed by those skilled in the art that the rate at which a component permeates through a separation membrane is dependent in part on the driving force for that component. With respect to membrane separations in which the component is gaseous and passes from a feed gas mixture to a permeating gas on the exit side of the membrane, the driving force is related to the differential in fugacity for that component. Generally, fugacities for ideal gases are approximated by partial pressures and thus, conventionally, in gas separations, the driving force is referred to in terms of partial pressure differentials. The partial pressure of a component in a gas mixture can be defined as the concentration of the component in the gas mixture on a molecular basis times the total pressure of the gas mixture. Often, the concentration of the component on a molecular basis is approximated by the volume concentration of the component. In view of the effect of the concentration of the component in the gas and the total pressure of the gas on the partial pressure, the pressure of one of the effluent streams can be varied to provide suitable partial pressure differentials across the membrane to provide desirable fluxes of the component in response to fluctuations in feed composition. For instance, with the concentration of the desired component increasing on the feed side and the total pressure differential across the membrane remaining constant, a greater partial pressure differential results. The desired partial pressure difference can be maintained by increasing the permeate effluent pressure or decreasing the non-permeate effluent pressure in accordance with the present invention. The actual pressures utilized across the membrane(s) will be dependent upon the particular feed stream components to be separated and the type of membrane(s) utilized as well as other factors known to those skilled in the art.

The particular component of interest with regard to the present invention can be predominantly present in either the permeate or non-permeate effluent streams. For instance, in hydrogen purification, e.g., separation from methane and other hydrocarbons, hydrogen would be the component of interest and would be predominantly present in the permeate effluent stream. On the other hand, in the separation of air to produce nitrogen, oxygen would be predominantly present in the permeate effluent stream and nitrogen, the component of interest, would be present in the non-permeate stream. In order to control the concentration of the component of interest in the desired stream, a characteristic of the stream that is indicative of the concentration of the component is sensed. The composition of the component in the effluent stream is a preferred characteristic to be sensed. Typically, it will be most practical to sense the concentration of the component in the desired product stream. However, there may be instances when sensing the concentration of the component in the undesired product may be more appropriate, e.g., when there is substantially complete removal of an impurity component and the detection of the impurity component in the desired product stream would be difficult.

One preferred separation that can be performed in accordance with the present invention is the separation of hydrogen from light hydrocarbons, i.e., C1 to C5 carbon range, wherein hydrogen is the controlled component and is enriched in the permeate stream. Another preferred separation is the separation of carbon dioxide from natural gas wherein carbon dioxide is enriched in the permeate stream and natural gas is the controlled component(s) and is enriched in the non-permeate stream. Still another preferred separation is the separation of hydrogen from carbon monoxide in order to adjust the H2/CO molar ratio to be suitable for use as synthesis gas. Often, there is excess hydrogen which must be removed to obtain the desired ratio. Hydrogen is removed in the permeate stream and the mixed hydrogen and carbon monoxide stream having the desired H2/CO molar ratio is controlled and removed in the non-permeate stream. Preferably, the H2/CO molar ratio in the non-permeate product stream is from about 1:1 to 4:1.

Once the characteristic of the effluent stream is sensed, a pressure adjustment is performed on the permeate or the non-permeate stream in response thereto. The pressure adjustment will effect a change in pressure differential or driving force across the membrane and hence, change the concentration of the component in the effluent stream. The pressure can either be raised or lowered as necessary to attain a predetermined concentration of the component in the effluent stream. For example, in order to increase the driving force across the membrane, the pressure of the permeate stream would be lowered or the pressure of the non-permeate stream would be increased. Optionally, the pressures of both effluent streams could be adjusted. It is important to note that there are practical limits to the degree of adjustment possible since the non-permeate pressure cannot be adjusted above the feed pressure, and it would typically not be desirable to adjust the permeate pressure to below about atmospheric pressure.

Preferably, the process further comprises comparing the sensed characteristic, e.g., concentration, to a reference value, and establishing a target value in response to the comparison of the sensed characteristic and the reference value. This is preferably accomplished by employing a transmitter to send a process variable signal, i.g., signal proportioned to the sensed characteristic, to a process computer which performs the comparison and establishes the target value. The computer sends an output signal to the pressure adjustment device, e.g., control valve, that is used to adjust the pressure of the effluent stream.

Although it is possible to sense the characteristic and perform the pressure adjustment on a single effluent stream, e.g., permeate stream, it is also possible that a characteristic of the desired product stream be sensed and that the pressure of the other effluent stream be adjusted. For example, when it is desired to control the concentration of a component in the permeate stream, it is preferred that a characteristic of the permeate stream be sensed and that the pressure be adjusted on the non-permeate stream. Similarly, the permeate pressure can be adjusted when the non-permeate stream is controlled. Such operation can provide a product stream at a relatively constant pressure as well as purity, which is often beneficial when the product stream is used in further downstream processing.

A variety of types of suitable designs of membrane separation systems exist depending upon the desired gas separation. Thus, the membrane may be employed in plate and frame form, or may comprise spiral would film membranes, tubular membranes, hollow fiber membranes, or the like. The use of hollow fiber membranes is generally preferred due to the high surface area per unit of membrane that can be obtained thereby. It will be appreciated that, when membranes are used in tubular or hollow fiber form, a plurality of such membranes can conventionally be arranged in parallel bundle form. In such embodiments, the feed gas stream can be brought into contact with either the outer or shell side, or the inner or tube side of the membrane particles. It is commonly preferred to pass the feed gas stream to be treated to the shell side of the separation zone, as this arrangement generally results in a relatively lower pressure drop across the membrane than when the feed gas is passed to the tube side of the membrane. Those skilled in the art will appreciate that the flow of the feed gas and of the permeating gas within the separation zone can be either cocurrent or countercurrent. Using bundles of hollow fiber and tubular membranes, the passage of feed gas can be either radial or axial with respect to the direction in which the hollow fibers or tubular membranes are positioned within the separation zone.

Typical of the types of membrane materials utilized in membrane separation processes include metallic and inorganic membranes as well as various organic polymeric materials or such organic polymeric materials mixed with inorganic materials such as fillers, reinforcements and the like. Organic polymers that may be considered for various practical commercial operations include such materials as polysulfones; polystyrenes; including such styrene-containing polymers as acrylonitrile, styrene copolymers, styrene-butadiene and styrene-vinylbenzyl halide copolymers; cellulosic polymers, such as cellulose acetate, cellulose acetate-butyrate, methyl or ethyl cellulose; polyamides and polyimides; polycarbonates; polyurethanes, polyesters, including polyacrylates, polyethylene; polypropylene; polyvinyl pyridines, and the like. Such polymers may be either substituted or unsubstituted, with typical substituents of such substituted polymers including halogens, such as chlorine, fluorine and bromine; hydroxyl groups; lower alkyl groups; lower alkoxy groups; monocyclic aryl; lower acyl groups, etc.

The use of a permeable membrane in conjunction with a coating material is also known, with such combinations enabling good selectivity of separation to be achieved together with high flux through the membrane. Typical coatings include substituted or unsubstituted polymers that are either solid or liquid under gas separation conditions. Examples of such coating materials include synthetic and natural rubbers, organic prepolymers, polyurethanes, polyamines, polyesters and the like. The coatings may be polymerized either before or after the application thereof to the permeable membrane with which they are to be employed. The above descriptions of membrane designs, types of materials and coatings are provided for illustrative purposes and form no significant part of the present invention.

The apparatus of the present invention includes a membrane separation system containing (a) a membrane separation system containing at least one gas permeable membrane; (b) means for passing a gaseous feed stream comprising said component to the membrane separation system at a substantially constant flow rate and elevated feed pressure; (c) means for recovering a permeate stream and a non-permeate stream from said membrane separation system, said effluent stream comprising one of said permeate stream or said non-permeate stream; (d) means for sensing a characteristic of said effluent stream that is indicative of the concentration of said component; and (e) means for performing a pressure adjustment on said permeate stream or said non-permeate stream in response to said sensed characteristic. Preferably, the sensing means will comprise an analyzer that is capable of providing a compositional analysis of the component in the effluent stream. Suitable analyzers for use in the present invention include gas chromatographs and infrared analyzers. A preferred means for adjusting the pressure of the effluent stream comprises a control valve that is capable of raising or lowering the pressure in response to the sensed characteristic.

The following example is presented with reference to the drawing and sets forth a specific aspect of the present invention. All parts and percentages of gases and liquids are expressed in moles unless otherwise noted.

A feedstream containing about 80% $H_2$, about 16% $N_2$ and about 2% each of $CH_4$ and Ar are fed at a pressure of about 1600 psia and a flow rate of about 50,000 scfd to a permeator, 10, via line 1. Permeator 10 is a hollow fiber-containing permeator of the type schmatically depicted in U.S. Pat. No. 4,172,885, issued Oct. 30, 1979, herein incorporated by reference. The permeator contains a polysulfone membrane having about 90 square feet of effective membrane surface area, and the membrane exhibits a hydrogen permeability of about $70 \times 10^{-6}$ cubic centimeters of hydrogen (STP) per square centimeter of surface area per second per centimeter of mercury partial pressure differential.

During steady operation, hydrogen at about 98% purity and at a flow rate of about 17,000 scfd is withdrawn as a permeate stream via line 2, passes through pressure controller/valve 30 and is withdrawn from the system via line 3 at a pressure of about 1000 psia. Non-permeate gas is withdrawn via line 4 and is passed through pressure controller/valve 20 which is actuated by a signal from gas analyzer 40 and is adjusted in response thereto to maintain the desired permeate stream purity. The non-permeate gas is then withdrawn via line 5 at a rate of about 33,000 scfd and contains about 71% hydrogen with the balance comprising $N_2$, $CH_4$ and Ar. During an upset condition, the feed composition changes to contain about 85% $H_2$ and the feedstream flow rate increases to about 55,000 scfd. However, it is desired to maintain both the permeate purity and pressure relatively constant due to downstream processing requirements. In accordance with the present invention, the non-permeate pressure is reduced sufficiently to maintain the hydrogen concentration in the permeate stream at about 98%, e.g., 50-250 psi, and the permeate pressure at about 1000 psia.

What is claimed is:

1. In a permeable membrane gas separation process which comprises:
    (a) passing a gaseous feed stream comprising a component to a permeable membrane gas separation system at a substantially constant flow rate and elevated feed pressure, said feed pressure being equal to or higher than the pressure required to operate the permeable membrane gas separation system and said feed stream being subject to fluctuations in composition; and
    (b) recovering from said permeable membrane gas separation system, an effluent stream comprising a permeate stream or a non-permeate stream; the improvement which comprises controlling the concentration of said component in said effluent stream by;

1) sensing a change in a characteristic of said effluent stream that is indicative of a change in the concentration of said component in said feed stream of from about 1 to 30%; and
2) without substantially altering the feed pressure or flow rate, performing a pressure adjustment on said permeate stream or said non-permeate stream in response to said sensed characteristic to alter the concentration of said component in said effluent stream as necessary to obtain a predetermined concentration of said component in said effluent stream.

2. A process according to claim 1 wherein said sensed characteristic is the concentration of said component in said effluent stream.

3. A process according to claim 1 wherein said effluent stream comprises said permeate stream.

4. A process according to claim 3 wherein said pressure adjustment is performed on said non-permeate stream.

5. A process according to claim 1 wherein said effluent stream comprises said non-permeate stream.

6. A process according to claim 5 wherein said pressure adjustment is performed on said permeate stream.

7. A process according to claim 1 including the further steps of: sensing the concentration of said component in said effluent stream; comparing the sensed concentration to a reference value; and establishing a target value of said effluent stream in response to the comparison of the sensed concentration and the reference value.

8. A process for controlling the concentration of a component in a permeate effluent stream from a permeable membrane gas separation system, which comprises:
(a) passing a gaseous feed stream comprising said component and at least one other component to the permeable membrane gas separation system at a substantially constant flow rate and feed pressure of at least about 100 psia, said feed pressure being equal to or greater than the pressure required to operate the permeable membrane gas separation system and said feed stream being subject to fluctuations in composition;
(b) recovering a non-permeate effluent stream enriched in the at least one other component relative to said feed stream;
(c) recovering a permeate effluent stream enriched in said component relative to said feed stream;
(d) sensing a change in the concentration of said component in said permeate effluent stream that is indicative of a change in the concentration of said component in said feed stream of from about 1 to 30%; and
(e) without substantially altering the feed pressure or flow rate, performing a pressure adjustment on said nonpermeate effluent stream in response to said sensed concentration to alter the concentration of said component in said permeate effluent stream as necessary to obtain a predetermined concentration of said component in said permeate stream without substantially altering the pressure of said permeate stream.

9. A process according to claim 8 wherein said feed pressure is in the range of from about 500 to about 2000 psia.

10. A process according to claim 8 wherein said component is hydrogen.

11. A process according to claim 10 wherein the at least one other component comprises hydrocarbons in the C1 to C5 carbon range.

12. A process for controlling the concentration of a component in a non-permeate effluent stream from a permeable membrane gas separation system, which comprises:
(a) passing a gaseous feed stream comprising said component and at least one other component to the permeable membrane gas separation system at a substantially constant flow rate and feed pressure of at least about 100 psia, said feed pressure being equal to or greater than the pressure required to operate the permeable membrane gas separation system and said feed stream being subject to fluctuations in composition;
(b) recovering a non-permeate effluent stream enriched in said component relative to said feed stream;
(c) recovering a permeate effluent stream enriched in the at least one other component relative to said feed stream;
(d) sensing a change in the concentration of said component in said non-permeate effluent stream that is indicative of a change in the concentration of said component in said feed stream of from about 1 to 30%; and
(e) without substantially altering the feed pressure or flow rate, performing a pressure adjustment on said permeate effuent stream in response to said sensed concentration to alter the concentration of said component in said non-permeate effluent stream as necessary to obtain a predetermined concentration of said component in said non-permeate stream without substantially altering the pressure of said non-permeate stream.

13. A process according to claim 12 wherein said component comprises natural gas hydrocarbons.

14. A process according to claim 13 wherein the at least one other component is carbon dioxide.

15. A process according to claim 12 wherein said component comprises a mixture of hydrogen and carbon monoxide in a molar ratio of from about 1 to 4 moles of hydrogen per mole of carbon monoxide.

16. A process according to claim 15 wherein the at least one other component is carbon dioxide.

* * * * *